July 12, 1932.  N. BOWER  1,867,054

FRUIT GRADER

Filed May 29, 1930  2 Sheets-Sheet 1

Inventor

Nicholas Bower.

By T. R. Bryant

Attorney.

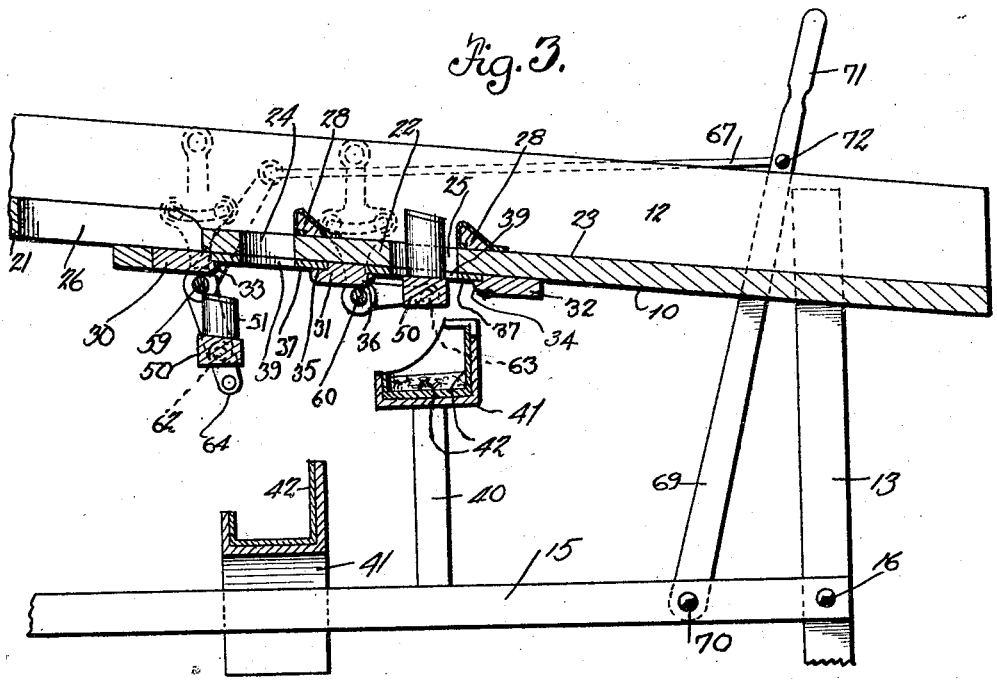

Patented July 12, 1932

1,867,054

UNITED STATES PATENT OFFICE

NICHOLAS BOWER, OF GASPORT, NEW YORK

FRUIT GRADER

Application filed May 29, 1930. Serial No. 457,316.

This invention relates to improvements in fruit graders of the assorting type.

The primary object of this invention is to provide a device of the above mentioned character, having means for grading fruit while the same is moving over an inclined surface.

A further object of this invention, is to provide a fruit grading machine of the type having a plurality of different sized apertures for the passage of predetermined sizes of fruit whereby fruit of the same size may be collected or sorted for marketing.

A still further object of this invention is to provide a fruit grader of the above mentioned character having a reciprocating plunger for each of the grading apertures whereby fruit of a size larger than the aperture may be moved out of the opening and forwarded to the adjacent series of apertures for passage therethrough.

A still further object of this invention is to provide a fruit grading machine of the above mentioned character having means for conveying the fruit to a collection receptacle after the same has been graded or assorted.

A still further object of this invention is to provide a fruit grading machine of the character described having manually operable means for causing the plungers to be moved through the apertures to displace fruit larger than the aperture thereby clearing the apertures for the reception of other fruit.

A still further object of this invention is to provide a fruit grader of a portable construction for allowing the device to be easily moved or carried from one point to another of convenience.

Figure 1:
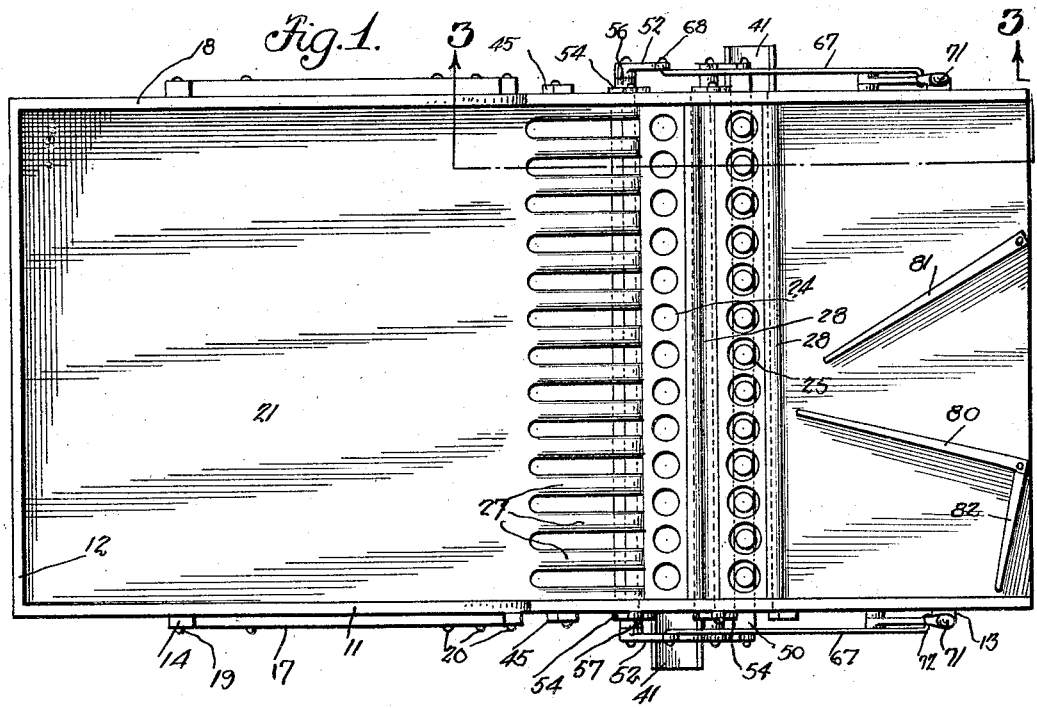
Figure 2:
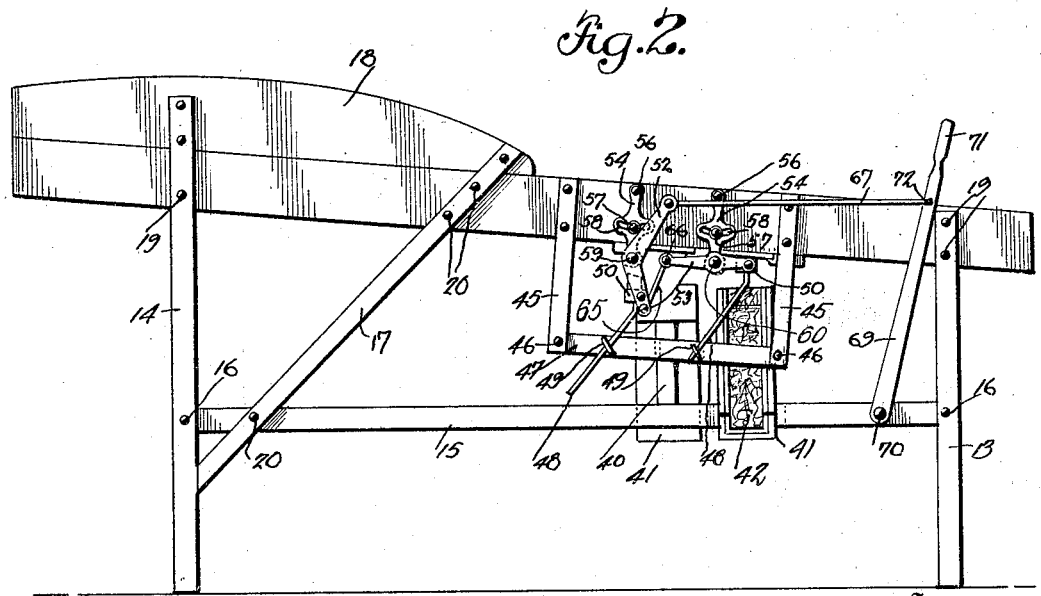

Other objects and advantages of the invention will become apparent during the course of the following description forming a part of this specification and in which, Figure 1 is a top plan view of the invention showing the inclined table and the series of grading apertures extending transversely across the table, the guiding strips on the inclined surface being illustrated as diverging inwardly;

Figure 2 is a side elevational view of the invention illustrating the operating mechanism carried by the table for actuating the reciprocating plungers through the series of grading apertures in an alternate fashion;

Figure 3 is a longitudinal cross sectional view taken on line 3—3 of Figure 1 looking in the direction of the arrows and illustrating the arrangement of the reciprocating plungers relative to the apertures and the collecting troughs mounted therebelow; and Figure 4 is a transverse cross sectional view of the invention illustrating the opposite arrangement of the conveyor troughs and one set of reciprocating plungers in their operative position relative to one series of apertures.

In the drawings, wherein for the purpose of illustration is shown a preferred form of the invention and wherein like reference characters are employed to designate like parts throughout the same, the numeral 10 designates an inclined table having side walls 11 and one end wall 12.

The inclined table 10, is supported by a pair of short legs 13 at one end and a pair of longer legs 14 at the opposite end secured to the table by means of rivets 19. Longitudinal brace bars 15 are provided and connect the vertical legs 13 and 14 as by means of rivets 16 while diagonal brace bars 17 have one of their ends connected to the brace bars 15 and their upper ends secured to the side walls 11 and an extension thereof indicated by the reference character 18. Rivets 20 are employed for connecting the diagonal brace bars 17 to the brace bars 15, and side walls 11 of the inclined table 10. The side extensions 18 are retained in place by being riveted to the extended ends of the vertical standards 14 and the diagonal brace bars 17. If desired, the side extensions 18 may be connected at one end by a cross piece 20' for preventing fruit or the like falling from the table.

The inclined table 10 is formed of sections 21, 22 and 23, in spaced relation in order to form transverse slots 24 and 25. Longitudinal slots 26, are formed in the table section 21 to provide a series of longitudinally extending fingers 27 presented to the spaced openings 24, whereby fruit to be graded will be spread over the grading area.

Secured to each of the table sections 22 and 23 is a buffer strip 28, in proximity to the transverse slots 24 and 25, which strips are covered with a soft material such as felt to prevent bruising of the fruit when the fruit engages the buffers.

On the underside of the table adjacent the slots 24 and 25 are positioned guiding strips 30, 31 and 32.

It will be noted that the guiding strips 30, 31 and 32 are secured to the table sections 21, 22 and 23 respectively and extend parallel with the slots 24 and 25. Longitudinal grooves 33 and 34 are formed in the strips 30 and 32 while the central strip 31 is provided with opposite grooves 35 and 36 for forming a sliding guideway for gauging boards 37 having apertures 38.

Secured to each of the side brace bars 15 are supporting bars 40 for supporting a transverse inclined trough 41 of rectangular shape in cross section and lined with a soft material 42 such as felt. The supporting bar 40 is only adapted to support one end of the trough 41 while the free end rests upon the other side brace bar 15. Opposite arrangement may be given to the troughs 41 or they may be arranged to extend downwardly in the same plane. It is more convenient to have the troughs arranged in oppositely downwardly extending position as the receptacles for collecting the fruit will not have to be placed too close together.

Attached to the central portion of each of the table sides 11 are a pair of depending bars 45, connected at their ends by means of rivets 46 to a cross bar 47. The cross bar 47, is provided for slidably supporting a pair of rods 48 by means of eyelets 49 while the opposite ends of the rods 48 are rigidly secured to a pair of bars 50 which extend transversely of the table 10 and under the openings 24 and 25.

Secured to each of the bars 50 is a series of plungers 51 for entering the openings 39 in the gauging strips 37. The cross bars 50 are pivotally supported by means of a bell crank 52 and a lever 53 pivotally attached to the adjustable members 54 which are secured to the sides of the table as at 56. A bolt 57 passes through a slot 58 in each of the members 54 for adjusting the members 54 in any desired position. The bell cranks 52 are secured to a rock shaft 59 extending between the two side members 54 while the levers 53 are fixed to the rock shaft 60 extending between corresponding members 54. The lower ends of the bell cranks 52 are pivotally attached to one of the cross bars 50 at each end thereof while as at 62 each of the levers 53 are provided for pivotally carrying the other cross bar 50 as at 63.

An extension 64 is formed on each of the bell cranks 52 to which is pivotally secured a link 65 adapted to connect to the lever 53 at 66. To the opposite end of the bell crank 52 is secured a link 67 by means of a bolt or the like 68. The other end of the link 67 is pivotally fastened to the upper end of an operating lever 69 pivotally attached to the side brace bars 15 as at 70. A handle 71 may be formed above the pivot point 72 of the connecting link 67 in order to cause the operation of the device.

It is to be understood that the mechanism for reciprocating the plungers 51 through the openings 24 and 25 is in duplicate and carried by each side of the table frame in order that the device may be manually operated from both sides of the table depending upon which side the operator desires to be positioned.

For a consideration of the operation of the grading machine, the ungraded fruit is first placed on the inclined table at the uppermost portion of the incline, whereupon the fruit rolls down toward the openings 39 of the removable apertured strips 37. The fruit of a certain predetermined size will pass through the first or smaller series of openings 39 while the remainder of the fruit will not, but will rest against the buffer strip 28 until the operator reciprocates the lever 69 by means of the handle 71 to cause the reciprocating plungers to alternately pass in and out of each series of openings 39, for displacing the fruit and causing the same to be moved toward the next series of apertures, the operation being repeatedly carried out.

The graded fruit may be collected as by means of troughs 41, disposed beneath the openings 39 for conveying the graded fruit to one side of the machine whereby it is collected in shipping crates to be delivered for transportation.

Deflectors 80 and 81 are adapted to be pivoted to the table top 10, and it will be noted that the deflector 80 is provided with an extension 82 for closing a portion of the table and forming a barrier for the fruit whereby the remainder of the fruit after having passed by the openings 39 may be deflected as desired into a receptacle and graded as the largest or choice fruit.

It is to be understood that various changes in the shape, size and arrangement of parts may be resorted to without departing from the spirit of the invention or the scope of the subjoined claims.

Having thus described the invention, what is claimed is:—

1. A fruit grading machine of the character described comprising an inclined chute, having sides and one end and having transverse slots formed in the mid section thereof, a guide flange at the lower side edge of each opening, apertured strips slidably secured in the guide flanges, buffer strips extending longitudinally relative to the transverse slots, inclined conveyor chutes mounted below the apertured strips, cross bars pivotally mounted below the apertured strips between the conveyor chutes and the table, plungers mounted in spaced relation on the cross bars, said plungers being adapted to register with the apertures in the removable strip for clearing the same, means for guiding the cross bars and plungers into and out of the apertures and manual means on opposite sides of the chute for causing the plungers to be moved into and out of the apertures.

2. A grading machine of the character described comprising an inclined chute having transverse openings formed in the mid-section thereof, a guide flange at the lower side edge of each opening, buffer strips mounted on one side of the transverse openings, a removable strip slidably mounted in the guide flanges below the openings and having a series of apertures, conveyor guides mounted below each transverse opening, a pair of cross bars pivotally carried by the table, means for guiding the cross bars into and out of engagement with the apertured strips, plungers carried by each of the cross bars adapted to register with the apertures in the transverse openings and manual means on both sides of the chute for moving the plungers into and out of the aperture whereby the apertures may be cleared of a larger sized fruit.

3. A fruit grading machine of the character described, comprising an inclined chute having transverse openings formed in the mid section thereof, an apertured strip removably carried in each of the transverse openings, a buffer strip mounted on one edge of the openings, a conveyor chute positioned under each apertured strip, a cross bar extending longitudinally of each apertured strip and transverse opening, rock shafts journalled in the chute, a bell crank lever fixed to one rock shaft, a lever fixed to the other rock shaft, corresponding ends of the two levers being pivotally connected to an associated cross-bar, an operating lever pivoted on each side of the chute, a connecting link for pivotally connecting each operating lever to the other end of the associated bell crank lever, means for guiding the cross bars in a vertically swinging fashion in planes substantially parallel with the bottom of the chute, and a series of plungers mounted on the cross bars adapted to register with the apertures on the apertured strips whereby upon movement of the operating levers, the plungers will be moved into and out of the apertures for clearing the same.

In testimony whereof I affix my signature.

NICHOLAS BOWER.